United States Patent [19]

Zirrilo

[11] Patent Number: 4,483,548
[45] Date of Patent: Nov. 20, 1984

[54] WHEEL CHAIR AUXILIARY DRIVE MEANS

[76] Inventor: James A. Zirrilo, 6206 Newberry Rd., Indianapolis, Ind. 46256

[21] Appl. No.: 427,596

[22] Filed: Sep. 29, 1982

[51] Int. Cl.³ .............................................. B62M 1/14
[52] U.S. Cl. ............................. 280/289 WC; 403/102
[58] Field of Search ............... 280/289 WC, 242 WC, 280/250; 403/100, 102

[56] References Cited

U.S. PATENT DOCUMENTS

| | | | |
|---|---|---|---|
| 2,286,655 | 6/1942 | Supnick | 403/100 |
| 3,563,592 | 2/1971 | Preston | 403/102 X |
| 4,316,616 | 2/1982 | Boivin | 280/289 WC |

FOREIGN PATENT DOCUMENTS 529233  6/1954  Belgium ..................... 280/242 WC

*Primary Examiner*—John A. Pekar
*Attorney, Agent, or Firm*—Woodard, Weikart, Emhardt & Naughton

[57] ABSTRACT

An auxiliary drive means removably mountable to a wheel chair. An auxiliary frame includes a wheel rotatably thereto which is driven by a hand crank and chain combination. A hand crank is mounted to a pivotally and telescopically adjustable steering post. A pair of chains connect the hand crank to the wheel. The auxiliary frame is mounted to the vertical posts of a wheel chair and includes a pair of threaded members to adjust mounting brackets provided on the auxiliary frame facilitating mounting of the frame to different configured wheel chairs.

2 Claims, 5 Drawing Figures

WHEEL CHAIR AUXILIARY DRIVE MEANS

BACKGROUND OF THE INVENTION

This invention is in the field of wheel chair construction and more particularly auxiliary drive means and the mounting thereof to wheel chairs. Wheel chairs are not particularly designed for use over long distances. As a result, various auxiliary drive means have been provided to increase the range of the wheel chair. In one form, a hand crank is provided which is operatively associated with the wheels by means of a chain. Three different versions are shown in the U.S. Pat. Nos. 3,485,510, issued to J. Merlan on Dec. 3, 1969; 3,994,509, issued to J. Schaeffer on Nov. 30, 1976 and 4,274,651, issued to H. H. Dumont on June 23, 1981. A similar tricycle arrangement is shown in the U.S. Pat. No. 4,109,927, issued to R. L. Harper on Aug. 29, 1978.

Typically, the drive means is designed to be removably mounted to the front vertical post of the wheel chair with a hand crank provided for use by the operator. Such a type is shown in the aforementioned U.S. Pat. No. 3,485,510 and is also available from Orthopedic Systems, Inc., Route 1, Box 136A, Nelsonville, Ohio 45764 and Fabrique Par:Unicycle Inc., 2143, Rue St.-Patrick, Montreal, Quebec, Canada.

Disclosed herein is an improved drive means over the latter mentioned drive means. The improved version disclosed herein is particularly advantageous in that it is easily mounted to and removed from a variety of different sized and configured wheel chairs. In U.S. Pat. No. 3,485,510, the drive means in an alternate embodiment includes a telescopic rod adjustable to fit different spacings of the vertical wheel chair posts. The adjustment means of the mounting structure disclosed herein includes an adjustable in line threaded member to facilitate different spacing of the wheel chair vertical post. Further, the steering post of the drive means may be pivoted and telescoped to the exact position of the person sitting in the wheel chair facilitating ease of use. A pair of continuous roller chains are used in lieu of the prior approach of using a single roller chain thereby enabling the hand crank to be more accurately positioned with respect to the user's hands.

SUMMARY OF THE INVENTION

One embodiment of the present invention is an auxiliary drive apparatus mountable to a wheel chair comprising an auxiliary frame removably mountable to a wheel chair, the auxiliary frame including a first pair of posts engaging brackets spaced apart a maximum distance when mounted to the wheel chair. The brackets are movably mounted to the frame and are movable apart to a second distance less than the maximum distance to allow mounting and unmounting of the frame to the wheel chair. The apparatus further includes a wheel rotatably mounted to the frame, a hand crank movably mounted to the frame, connecting means engaged with the wheel and the hand crank and operable to drive the wheel to move the wheel chair as the hand crank is moved, and adjustment means on the frame and operably associated with the brackets being operable to adjust spacing between the brackets to change the maximum distance the brackets may be spaced apart allowing mounting of the frame to different wheel chairs with the frame including a first telescopically constructed rod with opposite ends upon which the brackets are mounted and the adjustment means including a first threaded member rotatably mounted and connected to one of the opposite ends and a second threaded member connected to the other of the opposite ends with the first threaded member in meshing engagement with the second threaded member and the adjustment means operable upon rotation of the first threaded member to change the distance between the opposite ends.

Another embodiment of the present invention is an auxiliary drive apparatus mountable to a wheel chair comprising an auxiliary frame removably mountable to a wheel chair, the auxiliary frame including a first pair of posts engaging brackets spaced apart a maximum distance when mounted to the wheel chair, the brackets being movably mounted to the frame and movable apart to a second distance less than the maximum distance to allow mounting and unmounting of the frame to the wheel chair, a wheel rotatably mounted to the frame, a hand crank movably mounted to the frame, connecting means engaged with the wheel and the hand crank and operable to drive the wheel to move the wheel chair as the hand crank is moved, and the frame includes a steering post with a proximal end pivotally mounted to the frame and a distal end with the hand crank mounted thereon, the connecting means includes sprocket means rotatably mounted at the proximal end, a first continuous chain operably connected to the wheel and the sprocket means, and a second continuous chain operably connected to the hand crank and the sprocket means.

It is an object of the present invention to provide a new and improved means for mounting an auxiliary drive means to a wheel chair.

A further object of the present invention is to provide a wheel chair auxiliary drive means having a steering post accurately positioned relative to the user's hands.

Yet another object of the present invention is to provide a new and improved auxiliary wheel chair drive means.

Related objects and advantages of the present invention will be apparent from the following description.

DESCRIPTION OF THE PREFERRED EMBODIMENT

Figure 1:
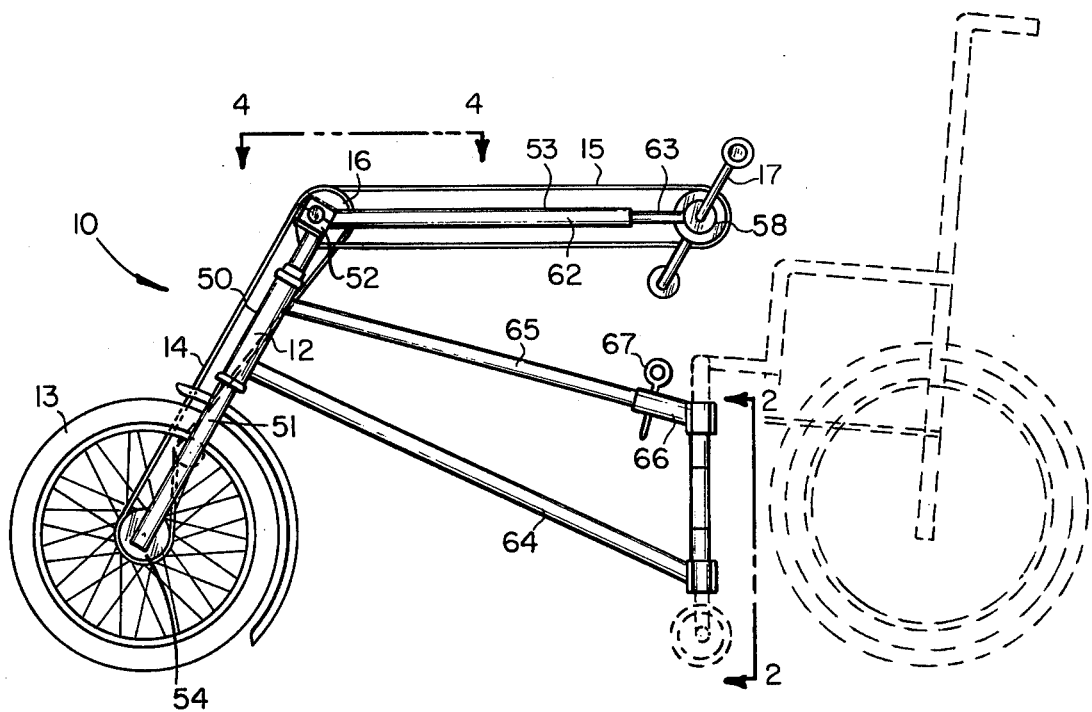
FIG. 1 is a side view of the auxiliary drive means shown mounted to a wheel chair.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown an auxiliary drive apparatus 10 mounted to wheel chair. Apparatus 10 includes a main frame 12 having a wheel 13 rotatably mounted thereto and driven by a pair of continuous roller chains 14 and 15 engaged respectively by sprocket mechanism 16 and hand crank 17. The rearward portion of frame 12 is provided with a pair of clamps for removably engaging vertically extending posts of the wheel chair.

The wheel chair includes a pair of forwardly positioned and vertically extending posts 18 and 19 (FIG. 2) having at their bottom ends a pair of rotatably mounted wheels 70 and 71. Four C-shaped clamps 20–23 are releasably engaged with posts 18 and 19. Clamps 20 and 21 are aligned and open outwardly being fixedly mounted respectively to a pair of tubes 24 and 25 in turn mounted to rod 26. One end of rod 26 is fastened by a conventional bolt 28 to tube 24 whereas the opposite end of the rod extends freely into tube 25. Likewise, C-shaped clamps 22 and 23 open outwardly and engage respectively tubes 18 and 19 being fixedly mounted to a pair of aligned tubes 27 and 48 with a second rod 29 being secured to tube 27 by bolt 30 and with the opposite end of the rod extending freely into tube 48.

A pair of mutually opposed and opening tubes 31 and 32 are mounted respectively to tubes 27 and 24 and receive and are bolted to upstanding rod 33. Likewise, a second pair of mutually aligned and opening tubes 34 and 35 are respectively mounted to tubes 48 and 25 and are bolted to rod 36. A threaded rod 37 is fixedly mounted to sleeve 38 in turn fixedly mounted to tube 36. Means are provided to prevent rotation between rod 37 and sleeve 38 with the outer end of rod 37 extending freely through a hollow cap 39 in turn mounted to tube 40 connected by means of a knee action pivot joint 41 to a second tube 42 fixedly mounted by tube 43 to tube 33. Threaded member 37 extends freely into tube 40 and is in meshing engagement with an internally threaded member 44 held captive in hollow cap 39. Rotation of internally threaded member 44 causes cap 39 along with tubes 40 and 42 to move toward or away from tube 36 thereby shortening or increasing the distance between clamps 20–21 and 22–23 to facilitate mounting of the frame to wheel chairs having different spacing between vertical posts 18 and 19.

Figure 2:
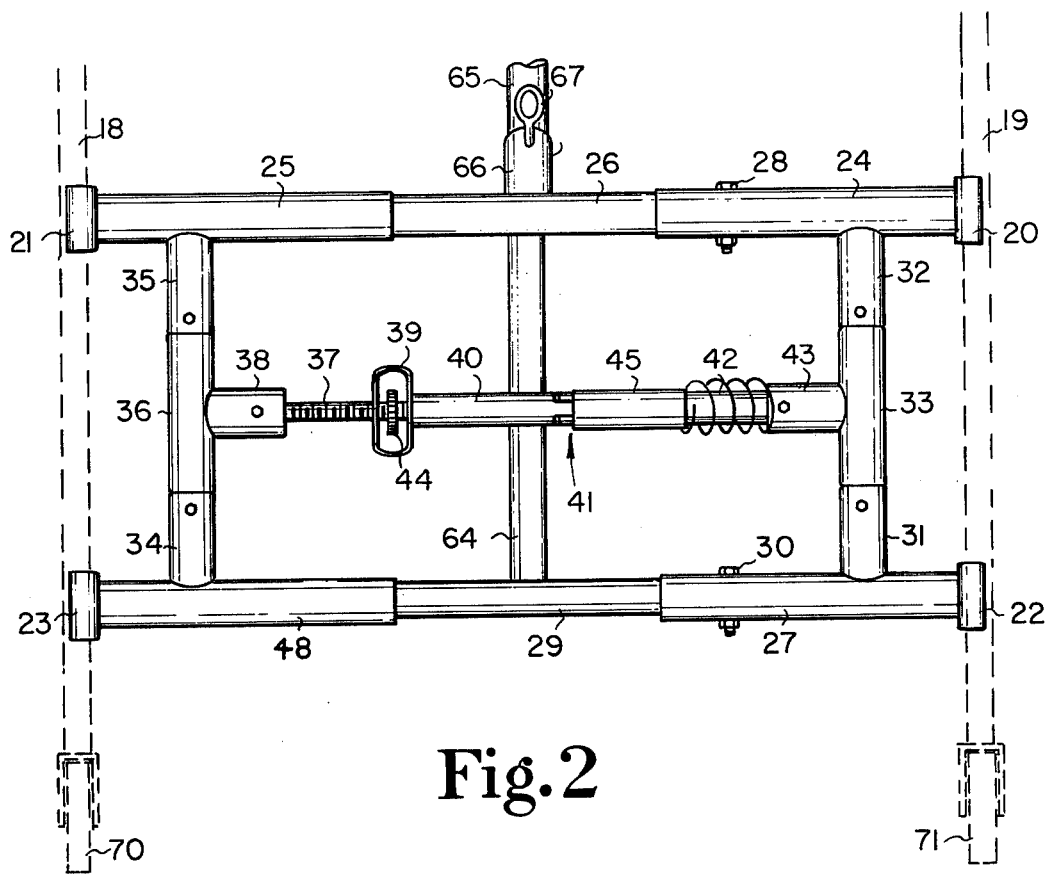
FIG. 2 is an enlarged fragmentary end view of the auxiliary frame mounted to the wheel chair looking in the direction of arrows 2—2 of FIG. 1.
Figure 3:
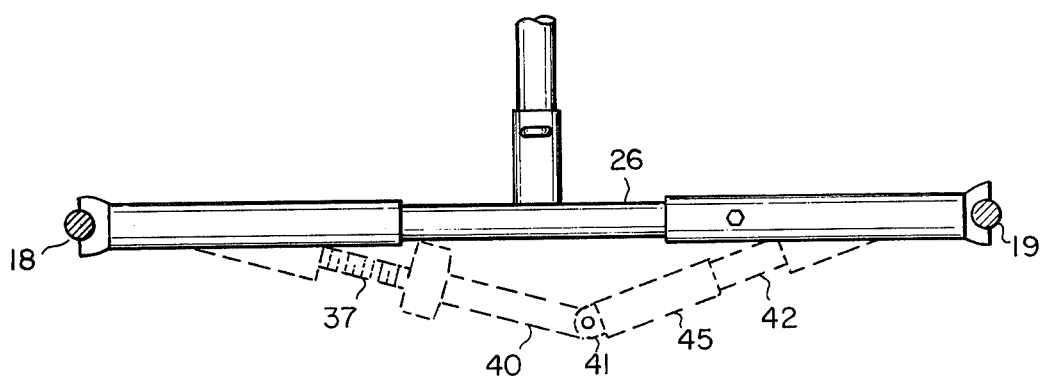
FIG. 3 is a fragmentary top view of the portion of the auxiliary frame shown in FIG. 2.

Knee joint 41 is provided to facilitate the installation of the frame to a wheel chair. When mounted, tubes 40 and 42 are aligned and sleeve 45 extends around joint 41 preventing the joint from bending. Sleeve 45 is slidably mounted to tube 42 and may be provided with a helical spring to normally position the sleeve around joint 41. In order to remove the frame from the wheel chair, sleeve 45 is moved to uncover joint 41 as shown in FIG. 2 with the joint then being pulled toward the person sitting in the wheel chair such as shown by the dashed lines in FIG. 3. Movement of tubes 40 and 42 outwardly by bending joint 41 causes clamps 20 and 22 to move toward clamps 21 and 23 thereby disengaging the C-shaped outer ends of the clamps from vertical posts 18 and 19.

Figure 4:
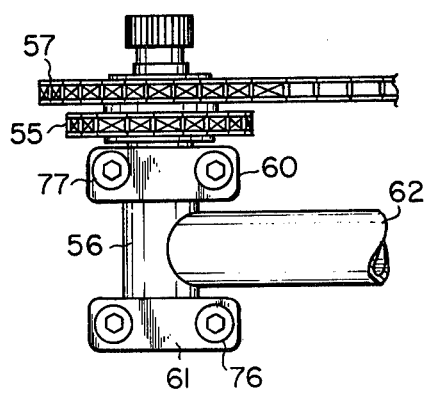
FIG. 4 is an enlarged fragmentary top view of the steering post looking in the direction of arrows 4—4 of FIG. 1.
Figure 5:
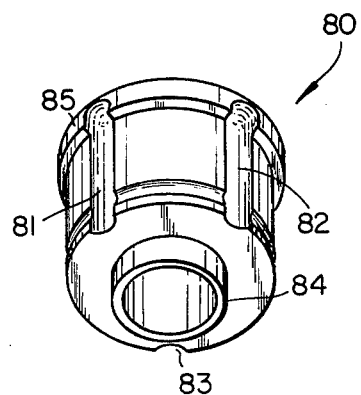
FIG. 5 is an enlarged perspective view of the bearing mounting the two chain sprockets to the top of the steering post.

Frame 12 (FIG. 1) includes a front tubular housing 50 bearingly receiving a conventional mounting post 51 having wheel 13 rotatably mounted thereto. Post 51 extends through housing 50 having at its top end two upwardly facing spaced apart axle seats 52 receiving axle 56 in turn connected to rod 62 having the hand cranks 17 mounted to the outer end thereof allowing the operator to both steer and propel wheel 13. A pair of axle mounting members 60 and 61 are bolted by fasteners 77 and 76 to seats 52 and have downwardly facing and radially formed recesses to complementarily receive axle 56 allowing axle 56 and rod 62 to pivot about the longitudinal axis of axle 56. A conventional sprocket 54 is operatively engaged with wheel 13 and is in meshing engagement with chain 14 in turn in meshing engagement with sprocket 57 (FIG. 4) mounted to rod 56 by bearing 80 so as to turn with adjacent sprocket 55, also mounted by bearing 80, in turn in meshing engagement with continuous roller chain 15. Hand crank 17 includes a pair of oppositely arranged handles mounted to a sprocket 58 rotatably mounted to steering post 53 with sprocket 58 in meshing engagement with chain 15. Thus, rotation of hand crank 17 causes rotation of chain 15, sprocket 55, sprocket 57, bearing 80, chain 14, sprocket 54 and wheel 13. Bearing 80 includes a cylindrical main body interrupted on its outer surface by three grooves 81, 82 and 83 to lockingly receive internally projecting tabs from sprockets 55 and 57 to insure rotation of sprockets 55 and 57 along with bearing 80 rotatably mounted to axle 56. Bearing 80 is mounted to axle 56 by a shoulder screw extending through internal sleeve 84 of bearing 80 and threadedly received by axle 56. Rib 85 is formed on the outer end of bearing 80 whereas a C-shaped wire clip is removably mounted to a groove extending around the inner end of the bearing adjacent axle 56 limiting movement of the sprockets 55 and 57 relative to bearing 80. Steering post 53 includes a pair of rods 62 and 63 telescopically connected together allowing the hand cranks to be pushed towards or away from the operator depending upon the configuration of the wheel chair. Roller chain 15 must be shortened or lengthened in the event the total length of the telescopic steering post 53 is decreased or increased. In one embodiment, a multiple gear drive mechanism is provided for wheel 13. Such a gear mechanism is conventional in design with the shifting mechanism mounted to steering post 53.

Fixedly mounted to housing 50 are a pair of rearwardly extending main posts 64 and 65. One end of post 64 is fixedly secured to tube 29 whereas one end of post 65 is slidably received into tube 66 secured to tube 26 and having a mounting pin 67 extending through tube 66 and post 65 locking the post and tube together.

When installing the auxiliary drive apparatus to the wheel chair, the clamps 20–23 are first mounted to posts 18 and 19 by pivoting joint 41 to the outward position thereby decreasing the distance between the clamps, then the clamps are aligned with the posts and joint 41 is pivoted to the straight position securing the clamps to posts 18 and 19. Sleeve 45 is then moved over joint 41 locking the joint and clamps in the mounting position. Best results are obtained by disengaging the wheels attached to the bottom ends of post 18 and 19 from the ground. Thus, once clamps 20–23 are engaged with posts 18 and 19, the wheel chair is caused to pivot slightly on its rearward wheels thereby lifting wheels 70 and 71 (FIG. 2) from the ground. Post 65 is provided with a series of holes through which pin 67 may be extended. Once wheels 70 and 71 are disengaged from the ground, pin 67 is extended through tube 66 and the particular hole provided in post 65 which will ensure continued disengagement of wheels 70 and 71 from the ground. One of the holes provided in post 65 may be an elongated slot thereby eliminating the necessity for removal of pin 67 during the initial mounting of clamps 20–23 to posts 18 and 19. As the wheel chair is pivoted, tubes 27 and 48 (FIG. 2) will be pivoted with the wheel chair with tube 29 tending to remain stationary since the tube is fastened directly to post 64. Thus, tube 29 may be slotted to receive bolt 30 preventing undue stress between tubes 27 and 29.

Threaded members 37 and 44 provide an adjustment means on frame 12 operable to adjust the spacing between clamps 20 and 21 and between clamps 22 and 23. With tubes 42 and 40 aligned as shown in FIG. 2, clamps 20 and 21 will be spaced apart a maximum distance equal to the distance between clamps 22 and 23. This maximum distance may be changed by rotating threaded member 44 allowing mounting of the auxiliary frame to different wheel chairs. By pivoting joint 41, the clamps may be moved apart to a distance less than the maximum distance.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. An auxiliary drive apparatus mountable to a wheel chair comprising:

an auxiliary frame removably mountable to a wheel chair, said auxiliary frame including a first pair of posts engaging brackets spaced apart a maximum distance when mounted to said wheel chair, said brackets being movably mounted to said frame and movable apart to a second distance less than said maximum distance to allow mounting and unmounting of the frame to said wheel chair;

a wheel rotatably mounted to said frame;

a hand crank movably mounted to said frame;

connecting means engaged with said wheel and said hand crank and operable to drive said wheel to move said wheel chair as said hand crank is moved;

adjustment means on said frame and operably associated with said brackets being operable to adjust spacing between said brackets to change the maximum distance said brackets may be spaced apart allowing mounting of said frame to different wheel chairs, said frame including a first telescopically constructed rod with opposite ends upon which said brackets are mounted, said adjustment means including a threaded member having an end fixedly connected to one of said opposite ends and also including a tubular assembly with an end fixedly connected to the other of said opposite ends, said tubular assembly includes a captive, internally threaded, rotatable fastener in meshing engagement with said threaded member which projects into said tubular assembly, said rotatable fastener upon rotation changes the distance between said opposite ends, and wherein:

said frame includes a steering post with a proximal end pivotally mounted to said frame and a distal end with said hand crank mounted thereon; said connecting means includes sprocket means rotatably mounted at said proximal end, a first continuous chain operably connected to said wheel and said sprocket means, and a second continuous chain operably connected to said hand crank and said sprocket means, said steering post is telescopically constructed;

said tubular assembly includes a pair of tubes with adjacent ends joined together forming a knee action joint located between said pair of tubes and also between said threaded member and said other opposite end with said tubular assembly further includes a sleeve movably mounted to one of said pair of tubes to hold said pair of tubes straight when positioned around said joint keeping said brackets spaced apart said maximum distance, said sleeve movable to a position allowing said joint to bend moving said brackets apart said second distance, said threaded rod and said pair of tubes extend in a straight line when said sleeve is positioned around said joint, said tubular assembly further includes a helical spring extending around one of said pair of tubes and in contact with said sleeve urging said sleeve to a position extending around said joint; and said tubular assembly being constructed to position said sleeve at all times apart from said threaded member and said internally threaded rotatable fastener.

2. The drive apparatus of claim 1 wherein said sprocket means includes a cylindrical bearing rotatably mounted to said frame and having fixedly secured thereto a pair of sprockets rotatable together with one sprocket in meshing engagement with said first chain and another sprocket in meshing engagement with said second sprocket, said cylindrical bearing including a plurality of axially extending grooves formed on the circumference thereof receiving said sprockets and limiting relative motion between said bearing and said sprockets, said sprocket means further includes an axle mounted to said frame having said bearing rotatably mounted thereto, said sprocket means including a bolt threadedly received by said axle and securing said bearing thereon.

* * * * *